Patented Feb. 17, 1953

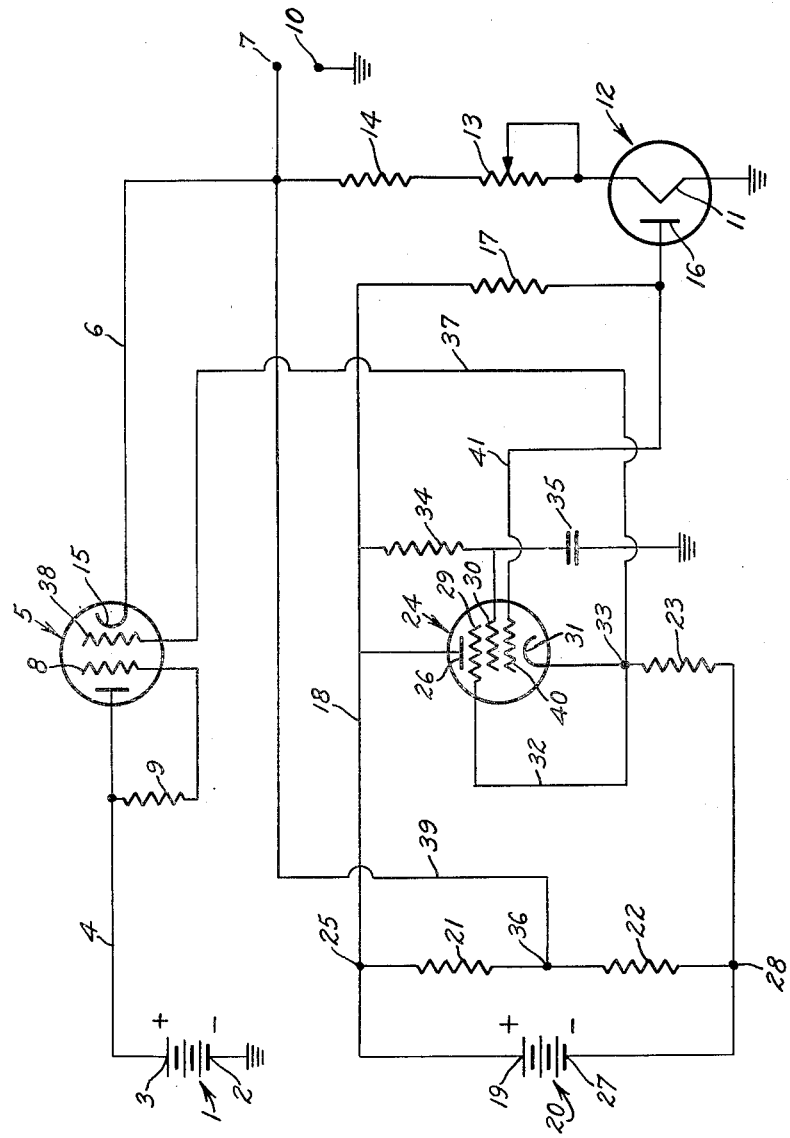

2,629,078

UNITED STATES PATENT OFFICE 2,629,078

VOLTAGE REGULATOR

Leo L. Helterline, Jr., South Norwalk, Conn., assignor to Sorensen & Company, Inc., Stamford, Conn., a corporation of Connecticut Application January 19, 1949, Serial No. 71,690

7 Claims. (Cl. 323—22)

This invention relates to voltage regulators and more particularly to a voltage regulator wherein a direct current voltage is regulated by a variable non-linear impedance in series with the load circuit.

When supplying a direct current voltage to a load, it is often desirable to regulate this voltage so that it remains substantially constant even though the load varies. The direct current voltage may be obtained from a rectifier supplied by an alternating current source in which case the direct current voltage would also vary with any fluctuation in the alternating current supply voltage. Certain regulators are limited in their application in that they operate by varying the circuit constants in the direct current rectifier or by adjusting the supply voltage thereto. One advantage of the present invention is that it does not operate on the rectifier circuit itself, but rather operates on the direct current output supplied to the load and thus is applicable for regulating a voltage supplied by a generator or some other direct current producing means.

In view of the foregoing, it is an object of the present invention to provide a simple, quick acting yet relatively accurate electronic voltage regulator.

Another object of the invention is to provide a direct current voltage regulator wherein the control is accomplished in the load circuit of the direct current power source and is thus independent of the rectifier or generator supplying the direct current voltage.

Another object of the invention is to provide a voltage regulator wherein the output voltage fed to the load may be held substantially constant at predetermined values over a predeterminable voltage range.

It is still another object of the invention to provide a voltage regulator having a variable non-linear impedance in the load circuit of a direct current power source whereby the voltage drop across the non-linear impedance determines the output voltage and wherein the value of the non-linear impedance is controlled by the output of a bridge circuit.

The above and other objects of the invention will become apparent by reference to the following detailed description especially when considered in connection with the accompanying drawing wherein the figure is a schematic diagram of one embodiment of the present invention.

In the drawing, non-regulated direct current power supply 1 is shown for schematic purposes as a battery but it is to be understood that this is representative only and actually direct current power supply 1 may be a rectifier, the input to which is an alternating current or it may be a direct current generator. In the embodiment shown, negative terminal 2 is grounded though of course this is not imperative.

Positive terminal 3 is connected by means of conductor 4 through vacuum tube 5 and thence via conductor 6 to output terminal 7. Positive potential is applied to screen grid 8 of vacuum tube 5 by connecting said screen grid through resistance 9 to conductor 4. In the present embodiment the other output terminal 10 is grounded inasmuch as negative terminal 2 of the non-regulated supply is likewise connected to ground. The output across terminals 7 and 10 is the regulated voltage applied to the load.

One side of a filament 11 of a diode vacuum tube 12 is connected through a variable filament limiting resistance 13 and a resistance 14 to the output terminal 7. The other side of filament 11 is connected to ground. In the event that terminal 2 of the non-regulated supply 1 and regulated output terminal 10 were not grounded, the other side of filament 11 would be connected to terminal 10. It is thus seen that filament 11 of vacuum tube 12 is connected across the output terminals 7 and 10 which provides the regulated supply to the load. The filament voltage is thus dependent on the output voltage across terminals 7 and 10. Resistance 14 is also connected by conductor 6 to cathode 15 of vacuum tube 5. Thus filament 11 is also in series with cathode 15 of vacuum tube 5. In the present embodiment, filament 11 is made of pure tungsten whose temperature and hence electron emission is a function of the voltage applied thereto.

Plate 16 of vacuum tube 12 is connected through resistance 17 and thence by conductor 18 to positive terminal 19 of a suitable source of potential 20. As in the instance of potential source 1, potential source 20 is shown for schematic purposes as a battery but as is evident to one skilled in the art, this source may be a rectifier or other direct current producing source.

Potential source 20 also provides an input voltage to a Wheatstone bridge whose arms comprise resistances 21, 22, 23 and vacuum tube 24. This input voltage is applied by connecting positive terminal 19 of potential source 20 to the terminal 25 which is directly connected to the resistance 21 and to a plate 26 of a vacuum tube 24 by conductor 18, and by connecting negative terminal 27 of potential source 20 to a terminal 28 which is an electrical junction for bridge resistances 22 and 23.

Supressor grid 29 and screen grid 30 of the vacuum tube 24 are connected in a conventional manner, the former being connected directly to the cathode 31 of vacuum tube 24 by conductor 32. Cathode 31 is also connected at terminal 33 to the bridge arm comprising resistance 23. Screen grid 30 is connected through resistance 34 via conductor 18 to positive terminal 19 of potential source 20. Screen grid 30 is also connected to ground through a capacitor 35. The output terminals of the Wheatstone bridge are terminals 33 mentioned above and a terminal 36 which is at the junction of bridge resistance arms 21 and 22.

Output terminal 33 is connected by conductor 37 to the control grid 38 of the vacuum tube 5 and output terminal 36 is connected by conductor 39 to regulated output terminal 7 which is electrically connected to cathode 15 of vacuum tube 5. Thus it is evident that the output of the bridge is fed to the control circuit of vacuum tube 5 and hence the output of vacuum tube 5 is adapted to respond to the output of the bridge.

Vacuum tube 24 of the bridge comprising resistance arms 21, 22, 23 and said vacuum tube is the variable component of said bridge. Control grid 40 of vacuum tube 24 is connected to plate 16 of vacuum tube 12 by means of a conductor 41. Thus any change in the plate current of vacuum tube 12, due to a change in its filament voltage, causes a change in the voltage across resistance 17 and a concomitant change in the potential of grid 40 and plate current of vacuum tube 24. This change in plate current produces a change in potential across terminals 33 and 36 and a resultant change in the voltage across the control circuit of vacuum tube 5.

The sequence of operation may be best understood by assuming that the voltage across regulated output terminals 7 and 10 tends to rise. Under such a condition, the voltage across filament 11 will likewise increase. This rise in filament voltage will raise the temperature of filament 11 thereby causing an increased electron emission therefrom. The increased emission results in a greater plate current through vacuum tube 12 and its plate resistance 17. The increased current flow through resistance 17 causes an increased voltage drop across said resistance and a corresponding decrease in the potential of plate 16.

As plate 16 is connected directly to control grid 40 of vacuum tube 24 there is a like decrease in the potential of control grid 40. The decrease in the potential of control grid 40 causes a decrease in plate current flowing through vacuum tube 24 which as heretofore mentioned is the variable arm of the bridge. This decrease in plate current causes a decrease in the potential of cathode 31 and a resulting unbalance in the bridge. Although the potential of cathode 31 follows the potential of control grid 40, that is a decrease in control grid potential likewise results in a decrease in cathode potential, the signal appearing at cathode 31 is of a greater magnitude than that appearing on control grid 40 due to the amplification properties of vacuum tube 24.

As the potential of cathode 31 decreases the potential appearing across bridge output terminals 33 and 36 has likewise decreased and the decreased potential is transmitted over conductors 37 and 39 to the control circuit of vacuum tube 5 which comprises control grid 38 and cathode 15. The decrease in potential across the control circuit causes a decrease in the flow of plate current through vacuum tube 5 and a resultant increase in the internal resistance of that vacuum tube. This increased internal resistance means an increased potential drop across vacuum tube 5 with a resulting decrease in the potential across output terminals 7 and 10. As the circuit components of the regulator are directly coupled there are no lengthy time constants involved and stabilization of the voltage across output terminals 7 and 10 is achieved almost instantaneously.

Should the output across terminals 7 and 10 tend to decrease, the sequence of regulation is in the opposite phase. Briefly a decrease in the voltage across terminals 7 and 10 results in decreased filament voltage and a decrease in the plate current of vacuum tube 12. The decreased current results in an increase in the potential of plate 16 of vacuum tube 12 and grid 40 of vacuum tube 24. The potential of cathode 31 of vacuum tube 24 likewise increases and this increase is reflected in an increase in the potential of control grid 38 of vacuum tube 5. An increased current flows through vacuum tube 5 with a resultant decrease in the internal resistance of the tube. The voltage drop across the tube is thus decreased and the potential across regulated output terminals 7 and 10 will rise.

Adjustment of the regulator is achieved by means of variable resistance 13 in series with filament 11 of vacuum tube 12. Increasing this resistance results in decreased potential across filament 11 and a resulting decrease in emission. Thus by proper adjustment of this resistance the resulting signal applied to control grid 38 of vacuum tube 5 can be controlled.

For purposes of simplifying the drawing, filaments for vacuum tubes 5 and 24 have not been shown but this in no way deters from an understanding of the invention.

As the current supplied to the load at output terminals 7 and 10 must flow through vacuum tube 5, it is evident that the load capacity of the regulator may be readily increased by inserting additional vacuum tubes in parallel with the vacuum tube 5. Such a modification is readily apparent to one skilled in the art and hence the schematic drawing shows only one such tube.

Furthermore, as the resulting output voltage is determined by the voltage of the potential source 1, less the voltage drop across vacuum tube 5, it is apparent to one skilled in the art that there are various ways in which the present regulator may be adapted to provide a regulated output for various predetermined values of output voltage without changing the value of potential source 1. One such way would be to vary the fixed bias on vacuum tube 5 so that the internal resistance could be varied by the control grid over certain predetermined ranges.

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

Having thus set forth the nature of my invention, what I claim is:

1. In a voltage regulator adapted to control the voltage output of a direct current supply within predetermined limits, an output circuit adapted to have a load connected therein, vacuum tube means having a plate circuit and a control grid circuit, said plate circuit being serially connected between said direct current supply and said output circuit, a bridge circuit, a first vacuum tube forming one arm of said bridge circuit said first vacuum tube having a control grid circuit, a second vacuum tube having at least a plate and a filament, said filament being connected across said output circuit thereby altering the impedance of said second vacuum tube in accordance with the variations in output voltage, a direct electrical connection between the plate of said second vacuum tube and the control grid circuit of said first vacuum tube, and a bridge output circuit connected to the control grid circuit of said vacuum tube means whereby the impedance of said vacuum tube means is altered in accordance with variations in the voltage of said bridge output circuit.

2. In a voltage regulator adapted to control the voltage of a direct current supply within predetermined limits, an output circuit adapted to have a load connected therein, vacuum tube means having a plate circuit and a control grid circuit, said plate circuit being serially connected between said direct current supply and said output circuit, a bridge circuit, a first vacuum tube having at least a plate, a cathode and a control grid, said vacuum tube forming one arm of said bridge, a bridge output circuit, the cathode of said first vacuum tube being directly connected to said bridge output circuit, a second vacuum tube having at least a plate and a filament, said filament being connected across said output circuit thereby altering the impedance of said second vacuum tube in accordance with variations in output voltage, a direct electrical connection between the plate of said second vacuum tube and the control grid of said first vacuum tube, an electrical connection from said bridge output circuit to the control grid circuit of said vacuum tube means whereby variations in the voltage of said output circuit causes variations in the output of said bridge circuit to thereby vary the impedance of said vacuum tube means and restore the output voltage to a predetermined value.

3. In a voltage regulator adapted to control the voltage of a direct current supply within predetermined limits, an output circuit adapted to have a load connected therein, vacuum tube means having a plate circuit and a control grid circuit, said plate circuit being serially connected between said direct current supply and said output circuit, a bridge circuit, a first vacuum tube having an input circuit and an output circuit, said output circuit forming one arm of said bridge, a second vacuum tube having at least a plate and a filament, said filament being connected across said output circuit thereby altering the impedance of said second vacuum tube in accordance with variations in output voltage, an electrical connection from the plate of said second vacuum tube to the input circuit of said first vacuum tube, and a bridge output circuit connected to the control grid circuit of said vacuum tube means.

4. In a voltage regulator adapted to control the voltage of a direct current supply within predetermined limits, an output circuit adapted to have a load connected therein, a first vacuum tube having a plate circuit and a control grid circuit, said plate circuit being serially connected between said direct current supply and said output circuit, a bridge circuit comprising a first resistance, a second resistance, a third resistance and a second vacuum tube having a cathode, plate and control grid, said resistances being serially connected and said cathode being connected to said third resistance and said plate connected to said first resistance whereby said plate and cathode are in series with all of said resistances, a bridge output circuit from terminals between the first and second resistance and the cathode and third resistance respectively, a third vacuum tube having at least a plate and a filament, said filament being connected across said output circuit thereby altering the impedance of said third vacuum tube in accordance with variations in output voltage, a direct electrical connection between the plate of said third vacuum tube and the control grid of said second vacuum tube, and electrical connection from said bridge output circuit to the control grid circuit of said first vacuum tube whereby variations in the voltage of said output circuit causes variations in the output of said bridge circuit to thereby vary the impedance of said first vacuum tube and restore the output voltage to a predetermined value.

5. In a voltage regulator adapted to control the voltage output of a direct current supply within predetermined limits; an output circuit adapted to have a load connected thereto; a controllable impedance connected in series between the direct current supply and the output circuit; a balancing network comprising four arms, one arm of which includes an electronic device having an anode, a cathode, and a control electrode; a connection between the balancing network and the controllable impedance for varying the series impedance of the circuit; a diode vacuum tube having an anode and a filamentary cathode, said filamentary cathode connected across the output circuit in series with an adjustable resistance whereby the electron emission from said cathode is varied in accordance with the voltage applied to the output circuit, voltage supply means for applying a positive potential to the anode of the electronic device and to the anode of the diode; and a conductive connection between the anode of the diode and the control electrode of the electronic device.

6. In a voltage regulator adapted to control the voltage output of a direct current supply within pre-determined limits; an output circuit adapted to have a load connected thereto; a controllable impedance connected in series between the direct current supply and the output circuit; a bridge circuit comprising four arms arranged with four junction points, two of which are connected to a source of direct current, and two of which are connected to the controllable impedance for varying the series impedance of the circuit; one of the four arms of the bridge circuit including an electronic device having an anode, a cathode, and a control electrode; a diode vacuum tube having an anode and a filamentary cathode, said filamentary cathode connected across the ouput circuit in series with an adjustable resistance whereby the electron emission from the cathode is varied in accordance with the voltage applied to the output circuit; voltage supply means for applying a positive potential to the anode of the electronic device and to the anode of the diode; and a conductive connection between the anode of the diode and the control electrode of the electronic device.

7. In a voltage regulator adapted to control the voltage output of a direct current supply within pre-determined limits; a controllable impedance connected in series between the direct current supply and the output circuit; a bridge circuit comprising four arms arranged with four junction points, two of said points connected to a source of direct current, and the other two connected to the controllable impedance for varying the series impedance of the circuit and the voltage across the output circuit; one of the four arms of the bridge circuit comprising an electronic device having an anode, a cathode, and a control electrode, the anode-cathode circuit of which is connected to the bridge arrangement; a diode vacuum tube having an anode and a filamentary cathode, said filamentary cathode connected across the output circuit in series with an adjustable resistance whereby the electron emission from the cathode is varied in accordance with the voltage applied to the output circuit and the resultant anode-cathode potential drop is in inverse proportion to the output voltage; voltage supply means for applying a positive potential to the anode of the electronic device and to the anode of the diode; and a conductive connection between the anode of the diode and the control electrode of the electronic device.

LEO L. HELTERLINE, Jr.

REFERENCES CITED

The following references are of record in the file of this patent:

UNITED STATES PATENTS

| Number    | Name       | Date           |
|-----------|------------|----------------|
| 2,008,855 | Drobish    | July 23, 1935  |
| 2,019,352 | Livingston | Oct. 29, 1935  |
| 2,261,982 | Exner      | Nov. 11, 1941  |
| 2,318,644 | Tubbs      | May 11, 1943   |
| 2,373,208 | Trucksess  | Apr. 10, 1945  |
| 2,457,615 | Van der Ven| Dec. 28, 1948  |

OTHER REFERENCES

Abstract of App. No. 595,360, filed May 23, 1945, by Kallmann, published March 28, 1950.